Dec. 11, 1928.

V. WATTS 1,694,570

ENAMELED ELECTRIC PERCOLATOR

Filed Nov. 16, 1927

Inventor

Verner Watts

By Frease & Bond Attorneys

Patented Dec. 11, 1928.

1,694,570

UNITED STATES PATENT OFFICE.

VERNER WATTS, OF ALLIANCE, OHIO, ASSIGNOR TO THE SEBRING MANUFACTURING CORPORATION, OF SEBRING, OHIO, A CORPORATION OF OHIO.

ENAMELED ELECTRIC PERCOLATOR.

Application filed November 16, 1927. Serial No. 236,622.

My invention relates to electric percolators for making beverages such as coffee and the like, and which heretofore have been made of metals such as aluminum, nickel plated brass, and the like, and in which the contained beverage has been exposed directly to metallic surfaces.

A beverage thus directly exposed to metal very frequently acquires an undesirable taste due to chemical action between the beverage and the metal.

Porcelain enamel has been used for providing a nonmetallic protective coating and for enhancing the appearance of kitchen utensils to be heated directly by an external source of heat, but it has heretofore been deemed impractical to provide an electric percolator of usual conformation with a porcelain enamel coating, by reason of the fact that the usual conformation of an electric percolator would not permit, if coated with enamel, efficient heating by the usual electric heating unit.

Accordingly the objects of the present improvements are to provide an enameled electric percolator having a satisfactory and efficient rate of heat transfer from a usual electric heating unit to the beverage contained in the percolator, by reason of the improved structural conformation of the percolator and its relationship with the heating unit.

These objects are attained in the improved enameled electric percolator hereinafter set forth in detail and which may be described in general terms as including a pot preferably made of sheet iron, a tubular base for the pot secured thereto and forming a dome therewith, a removable bottom cover plate for the dome base provided on its inner surface with a protective coating of a heat insulator such as asbestos, an annular water leg depending from the pot bottom and inwardly spaced from the inner base wall and forming a cup, and an electric heating unit fitting in the cup and having its top and sides enclosed by the walls of the cup.

Figure 1:
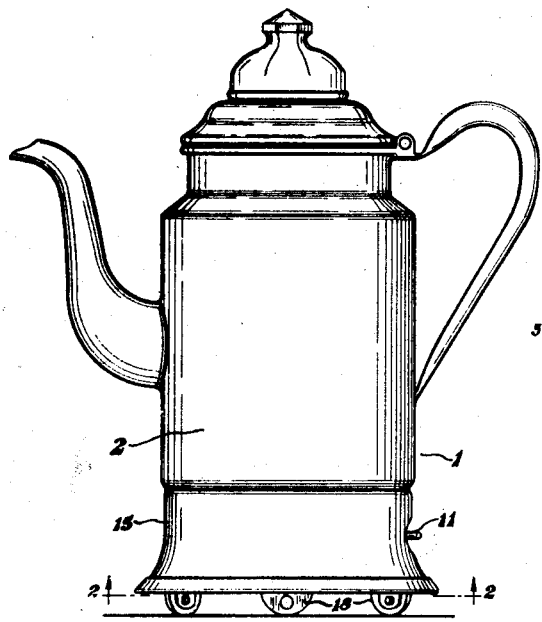
Figure 2:
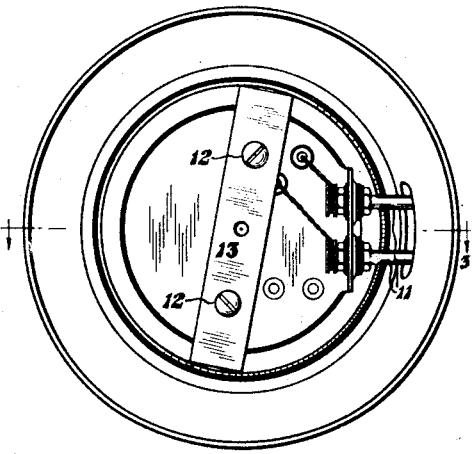
Figure 3:
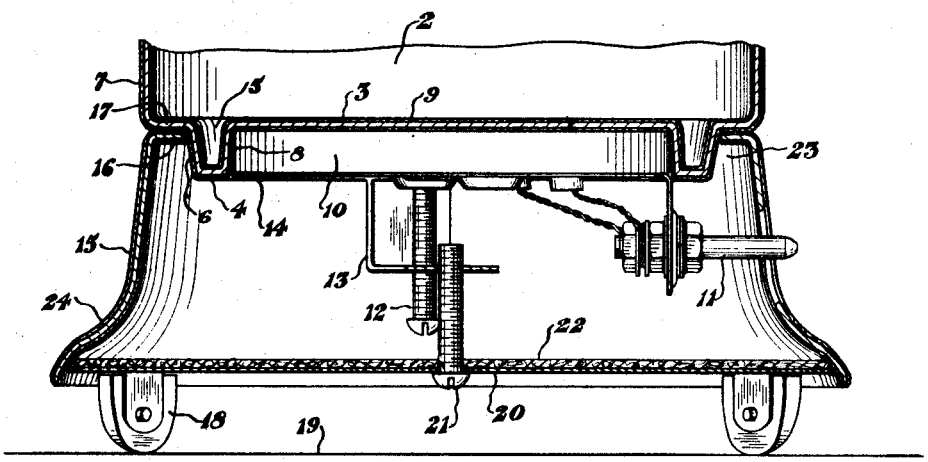
Figure 4:
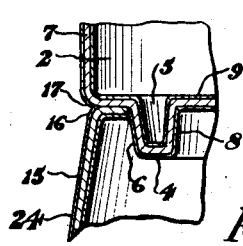

Preferred embodiments of the invention are illustrated in the enclosed drawing forming part hereof, in which Figure 1 is an elevation view of one embodiment of the improved enameled electric percolator;

Fig. 2, a bottom plane view thereof as in the direction of the arrows 2—2, Fig. 1, the bottom cover plate being removed;

Fig. 3, a fragmentary vertical axial sectional view thereof as on line 3—3, Fig. 2; and Fig. 4, a fragmentary sectional view similar to Fig. 3 of a modified embodiment of the invention.

Similar numerals refer to similar parts throughout the drawings.

The improved enameled electric percolator indicated generally at 1 includes a percolator pot 2, the upper portions of which may be of any usual construction, and provided with an improved bottom wall 3 having a depending annular water leg 4 formed therein, thus providing at the bottom of the pot an annular groove 5 which will be filled with a relatively thin annular ring of liquid when the pot is being used to make a beverage.

The outer side wall 6 of the water leg is preferably spaced a substantial distance inwardly from the side wall 7 of the pot, and the inner side wall 8 of the water leg forms with the central plate 9, a cup in which is snugly fitted an electric heating unit 10, having terminals 11 for connection through a suitable cord set, not shown, with an electric power line.

The electric heating unit 10 may be removably maintained in the cup as by means of screws 12 screwed in a bridge 13, the ends of which may be secured to the bottom wall 14 of the water leg.

A tubular base 15, preferably outwardly flaring at its lower end, is provided for the pot, and includes an inwardly extending flange 16 at the upper end of the base and abutting the outer peripheral band 17 of the pot bottom at the outside of the annular water leg 4.

Suitable feet 18 made of a suitable heat insulator are secured at the lower edge of the base 15 for elevating the same from the table top 19.

The base 15 and the pot bottom 3 form a dome, and the base is engaged at its lower open end with a cover plate 20 removably connected with the bridge 13 as by means of a central screw 21, thereby providing removable means connecting the base with the pot; and the inner surface of the cover plate is preferably provided with a sheet coating 22 of a heat insulator such as asbestos.

The spacing of the outer side wall 6 of the water leg a substantial distance inwardly from the side wall 7 of the pot and the tubular wall of the base 15, provides an annular heat retaining air chamber 23 on the outside of the water leg 4.

The pot 2 and the base 15 are coated preferably with porcelain enamel 24 and the electric heating unit 10 fits as snugly as practicable in the cup formed by the central plate 9 and the inner wall 8 of the water leg.

The relatively thin annular ring of liquid in the water leg when the pot is being used, is heated more rapidly than the main body of liquid in the pot, and consequently when vaporization commences a circulation is set up in the pot from the hotter liquid in the water leg to the cooler liquid above.

Heat is delivered from the unit 10 to the liquid in the water leg through the inner side wall 8 of the water leg fitting snugly about the side of the unit, and heat flows from the top of the unit to the central plate 9.

The provision of the sheet coating 22 of asbestos, on the inner surface of the cover plate 20, prevents the top of the table 19 upon which the percolator may rest from being burned or scorched, and retains heat in the dome formed by the base 15 in the pot bottom 3.

The use of the foregoing conformation for the pot in combination with the electric heating unit, permits the use of the desired protective coating of porcelain enamel, and instead of increasing the time required to heat up for percolation the beverage in the pot, reduces this time as compared with time required for ordinary metallic percolators; and the improved enameled electric percolator of the present construction retains heat longer than percolators of other construction.

In the modified embodiment of the improved percolator illustrated in Fig. 4, the base 15 is secured to the pot 2 as by spot welding the abutting flange 16 with the band 17.

I claim:

1. A pot including a tubular side wall and a bottom wall, a tubular base secured at its upper end to the pot and spacing the pot bottom wall above its lower end, a water leg formed in the pot bottom and depending downwardly therefrom, the outer wall of the water leg being spaced inwardly from the tubular walls of the pot and base, and the inner wall of the water leg and a central plate of the pot bottom forming a downwardly opening cup, and a heating unit fitting snugly in the cup.

2. A pot including a tubular side wall and a bottom wall, a tubular base secured at its upper end to the pot and spacing the pot bottom wall above its lower end, an annular water leg formed in the pot bottom and depending downwardly therefrom, the outer wall of the water leg being spaced inwardly from the tubular walls of the pot and base, and the inner wall of the water leg and a central plate of the pot bottom forming a downwardly opening cup, and a heating unit fitting snugly in the cup.

3. A pot including a tubular side wall and a bottom wall, a tubular base secured at its upper end to the pot and spacing the pot bottom wall above its lower end, a water leg formed in the pot bottom and depending downwardly therefrom, the outer wall of the water leg being spaced inwardly from the tubular walls of the pot and base, and the inner wall of the water leg and a central plate of the pot bottom forming a downwardly opening cup, and the pot and base being coated with porcelain enamel, and a heating unit fitting snugly in the cup.

4. A pot including a tubular side wall and a bottom wall, a tubular base secured at its upper end to the pot and spacing the pot bottom wall above its lower end, an annular water leg formed in the pot bottom and depending downwardly therefrom, the outer wall of the water leg being spaced inwardly from the tubular walls of the pot and base, and the inner wall of the water leg and a central plate of the pot bottom forming a downwardly opening cup, and the pot and base being coated with porcelain enamel, and a heating unit fitting snugly in the cup.

5. A pot including a tubular side wall and a bottom wall, a tubular base secured at its upper end to the pot and spacing the pot bottom wall above its lower end, a water leg formed in the pot bottom and depending downwardly therefrom, the outer wall of the water leg being spaced inwardly from the tubular walls of the pot and base, and the inner wall of the water leg and a central plate of the pot bottom forming a downwardly opening cup, a heating unit fitting snugly in the cup, a cover plate secured at the lower end of the tubular base, and a coating of heat insulating material upon the inner surface of the cover plate.

In testimony that I claim the above I have hereunto subscribed my name.

VERNER WATTS.